Feb. 12, 1924.
J. T. BECK
1,483,271
PLANTER ATTACHMENT FOR WALKING CULTIVATORS
Filed March 7, 1923  2 Sheets-Sheet 1
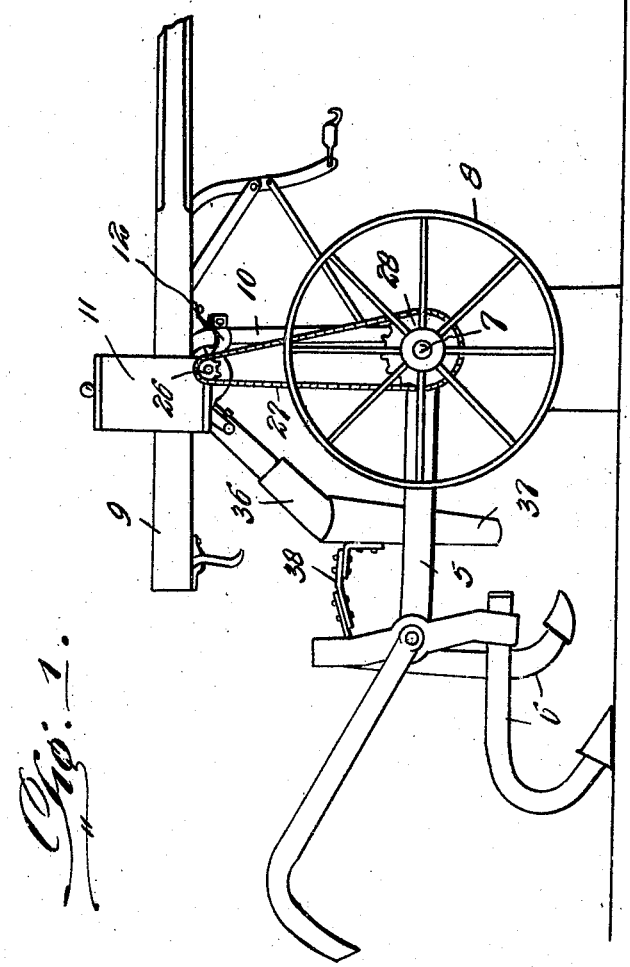

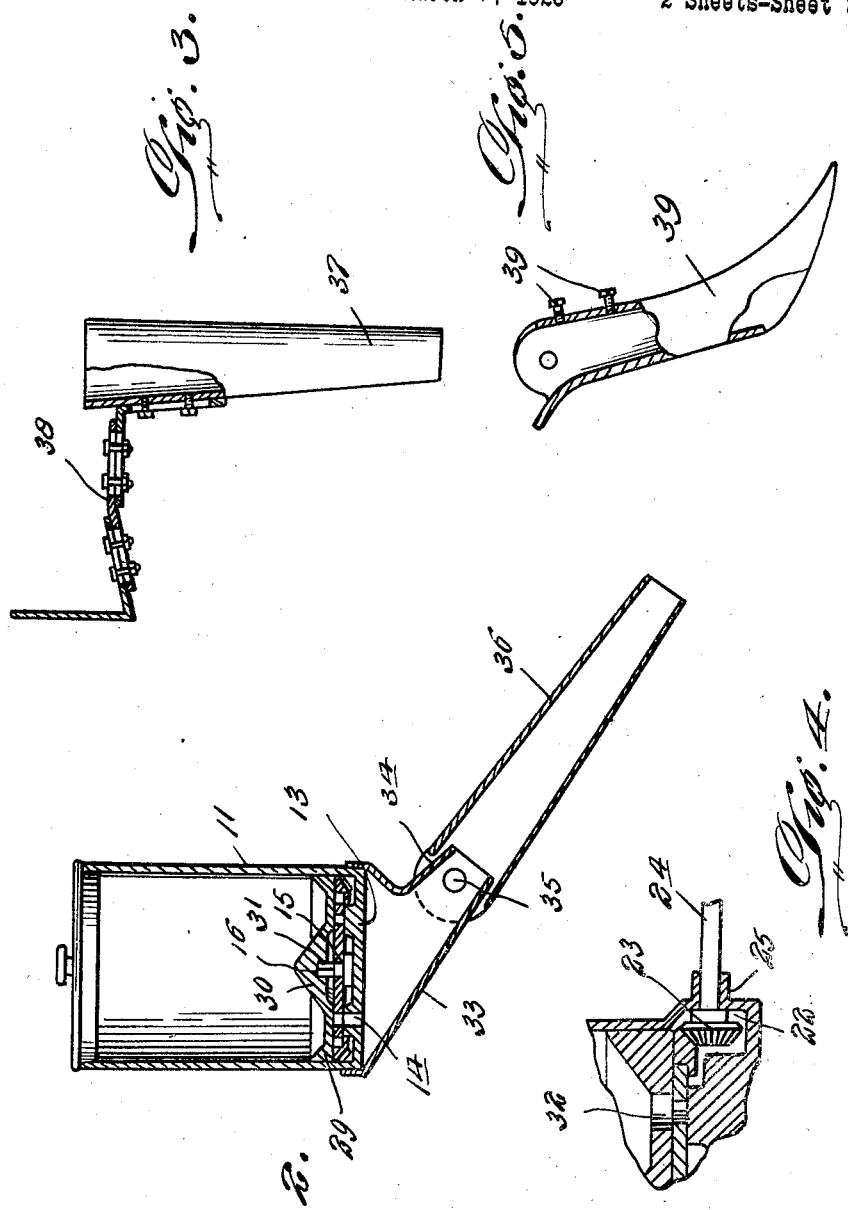

Patented Feb. 12, 1924.

1,483,271

UNITED STATES PATENT OFFICE.

JOHN THADDAUS BECK, OF EMBRY, MISSISSIPPI.

PLANTER ATTACHMENT FOR WALKING CULTIVATORS.

Application filed March 7, 1923. Serial No. 623,357.

*To all whom it may concern:*

Be it known that I, JOHN T. BECK, a citizen of the United States, residing at Embry, in the county of Webster and State of Mississippi, have invented certain new and useful Improvements in Planter Attachments for Walking Cultivators, of which the following is a specification.

The primary object of my said invention resides in the provision of a planter attachment that is well adapted for application upon practically all types of walking cultivators, with which I am now familiar, the nature of the invention being such as to permit of the ready application to and detachment from the said cultivators.

A further object of my invention is the provision of such a planter attachment that is comparatively simple of construction, and of such a nature as to be employed in conjunction with walking cultivators without materially changing the parts of the cultivator, my attachment, per se, embodying relatively few parts, and these so correlated as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevational view of a walking cultivator on display, the same being shown as equipped with my planter attachment.

Figure 2 is an enlarged vertical elevational view of the seed hopper of my planter.

Figure 3 is an elevation of one of the seed conveying pipes forming a part of my invention, the supporting arms for this pipe being shown in cross section.

Figure 4 is a fragmentary enlarged detailed cross sectional view of a portion of the seed distributing mechanism of my planter attachment, and Figure 5 is a vertical transverse cross section, partly in elevation of a boot attachment that may be employed in conjunction with my invention.

Figure 6 is a detail plan view of the dished seed holding plate.

Figure 7 is a detail plan view of the rotary seed feeding plate showing the manner of removably mounting it in a ring gear.

Referring to the drawings in detail, and particularly to Figure 1, there is shown a conventional form of walking cultivator including a frame 5, cultivator 6, supporting axle 7, traction wheels 8, tongue beam 9, and connecting arms 10 between the tongue beam and the said frame 5.

My attachment, per se, constitutes the provision of a receptacle 11, the same adapted to be clamped or otherwise rigidly secured as at 12 to the desired one of the usual pair of connecting arms 10 between the said tongue beam 9, and the frame 5 of a cultivator. The bottom wall of this receptacle 11 is formed with an annular ridge 13, through which is a seed outlet opening 14. Upon the said bottom wall of the receptacle, and inwardly of this ridge 13, there is formed a vertical projecting pin 15, the upper end thereof being squared as at 16, Figure 2. Engaging over the said pin 15 is a plate or disk 17, the same being formed with a plurality of openings 18, as well as a pair of laterally extending lugs 19 upon diametrically opposite sides thereof. This plate or disk 17 is carried by a bevelled ring gear 20, the same being formed with notches 21, for the reception of the said lugs 19 of the plate or disk 17. Beneath this bevelled ring gear 20, the receptacle 11 is formed with a pocket 22, within which is a bevelled gear 23 in mesh with the said ring gear, this gear 23 being carried by a shaft 24 projecting outwardly of an opening 25 in the said receptacle 11.

Upon the outer end of this shaft 24 is a comparatively small sprocket gear 26, over which is trained a sprocket chain 27, this chain extending downwardly, and being in turn trained over a relatively larger sprocket gear 28 carried by the appropriate one of the traction wheels 8 and adapted to rotate therewith.

In face to face contact with the disk or plate 17 as well as the ring gear 20, is a plate 29, the same being dished as shown, and formed with a central, conical-shaped projecting head 30. The under surface of this plate is formed with a square-shaped socket 31, for the reception of the squared end 16 of said pin 15, for preventing of the rotation of this plate. The plate 29 is formed at a desirable point thereon with a seed outlet opening 32, and it will at once be apparent that when the plate or disk 13 is rotated, and as often as the openings 18 are in a position beneath the seed outlet opening 32 of this plate, a number of the seeds will be received therein, and carried by the plate until the openings 18 register at the said opening 14 in the bottom wall of the receptacle.

It will be noted from an inspection of Figure 2 or Figure 4, that the seed feeding plate 17 extends beyond the annular rib formed on the bottom 13 and receives and mounts the ring 20 beyond the annular rib. The annular rib is of importance in connection with the seed feeding plate, as it provides a substantially small bearing surface for the plate at the point of formation of the seed receiving opening in said plate, so that close contacts between the seed feeding plate and the bearing surface of the annular rib is provided to prevent seeds and dirt entering the seed feeding opening from getting out between the seed feeding plate and the rib and clogging up the operating parts for feeding the seeds from the hopper. The provision of the annular rib is also of advantage as it will take up and compensate for wear between the plate and the bottom for maintaining the above relation with the seed feeding plate and if desired may be ground, if necessary, to make the bearing portion of the rib lie in the proper plane for supporting said plate. The seed holding disc 29 is provided with a central recess portion leaving an annular bearing face on the lower side thereof for contact and bearing cooperation with the seed feeding plate, this annular bearing face overlying the annular rib on the bottom so that a close bearing fit is provided between the seed holding plate and the seed feeding plate to prevent seeds or dirt from getting out between the plate in the operation of the feeding mechanism.

Upon the bottom of the said receptacle 11, there is removably positioned a hopper 33, the same being formed with an outlet neck 34, to which is pivotally secured as at 35, a downwardly extending rearwardly inclined seed conveying pipe 36. The outlet end of this pipe 36 communicates with the inlet and of an additional seed conveying pipe 37, the same being vertically and longitudinally adjustably connected through the instrumentality of bracket members 38 to the adjacent connecting beam between the cultivator elements 6.

In Figure 5, there is shown a planter boot 39 which may be employed in conjunction with this invention. This boot 39 is adapted to be detachably connected to the end of the said pipe 37 through the instrumentality of set screws 39, it being understood that this boot is to be employed for positively conveying the seeds into the furrows.

In view of the above description, it is believed by me that it will at once be apparent that I have provided a planter attachment that may be expeditiously applied to a walking type of cultivator, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

In combination, a hopper having a bottom formed with an upwardly projecting annular rib and formed with an outlet opening extending through said rib, said bottom having a central upwardly projecting stud, a seed feeding plate rotatably mounted on said stud and having bearing contact with the upper edge and extending beyond the outer edges of said rib, said plate being formed with a plurality of seed receiving openings adapted for successive registering with the seed outlet opening in said bottom, a ring gear removably connected to said seed feeding plate beyond the rib and supported by said plate, means cooperating with said gear for rotating said seed feeding plate, and a seed holder plate mounted for sliding movement in the hopper lengthwise thereof and having bearing contact with the inner side walls of said hopper and an annular bearing face contacting with the upper face of said seed feeding disc, said plate having an annular recessed part over the annular rib on the bottom, and a centrally and upwardly extending cone shaped portion for directing seeds from the central portion of the hopper into said annular recess, said plate being further formed with a seed delivering opening in the recessed part adapted for delivering seed from said hopper into the opening of said seed feeding disc.

In testimony whereof I affix my signature.

JOHN THADDAUS BECK.